(12) United States Patent
Gallucci et al.

(10) Patent No.: US 7,847,023 B2
(45) Date of Patent: Dec. 7, 2010

(54) POLYSILOXANE/POLYIMIDE COPOLYMER BLENDS

(75) Inventors: Robert Russell Gallucci, Mt. Vernon, IN (US); Gurulingamurthy M. Haralur, Karnataka (IN); Sanjay Mishra, Evansville, IN (US); Mark Sanner, Newburgh, IN (US)

(73) Assignee: Sabic Innovative Plastics IP B.V. (NL)

( * ) Notice: Subject to any disclaimer, the term of this patent is extended or adjusted under 35 U.S.C. 154(b) by 826 days.

(21) Appl. No.: 11/684,993

(22) Filed: Mar. 12, 2007

(65) Prior Publication Data
US 2008/0223602 A1 Sep. 18, 2008

(51) Int. Cl.
*C08L 67/00* (2006.01)
*C08L 71/00* (2006.01)
*C08L 79/08* (2006.01)
*C08F 283/04* (2006.01)
*C08G 73/10* (2006.01)

(52) U.S. Cl. .................... 525/89; 525/411; 525/412

(58) Field of Classification Search ................ 525/89, 525/411, 412
See application file for complete search history.

(56) References Cited

U.S. PATENT DOCUMENTS

| | | | |
|---|---|---|---|
| 3,023,192 A | 2/1962 | Shivers, Jr. | |
| 3,185,719 A | 5/1965 | Prober | |
| 3,325,450 A | 6/1967 | Holub | |
| 3,651,014 A | 3/1972 | Witsiepe | |
| 3,663,653 A | 5/1972 | Frohlich et al. | |
| 3,763,109 A | 10/1973 | Witsiepe | |
| 3,801,547 A | 4/1974 | Hoeschele | |
| 3,833,546 A | 9/1974 | Takekoshi et al. | |
| 3,847,867 A | 11/1974 | Heath et al. | |
| 3,850,885 A | 11/1974 | Takekoshi et al. | |
| 3,852,242 A | 12/1974 | White | |
| 3,855,178 A | 12/1974 | White et al. | |
| 3,972,902 A | 8/1976 | Heath et al. | |
| 3,983,093 A | 9/1976 | Williams, III et al. | |
| 3,986,477 A | 10/1976 | Bigland | |
| 4,011,279 A | 3/1977 | Berger et al. | |
| 4,038,237 A | 7/1977 | Snyder | |
| 4,051,163 A | 9/1977 | Berger | |
| 4,395,527 A | 7/1983 | Berger | |
| 4,404,350 A | 9/1983 | Ryang | |
| 4,414,355 A | 11/1983 | Pokorny | |
| 4,443,591 A | 4/1984 | Schmidt et al. | |
| 4,455,410 A | 6/1984 | Giles, Jr. | |
| 4,588,546 A | 5/1986 | Feil et al. | |
| 4,690,997 A | 9/1987 | Cella et al. | |
| 4,808,686 A | 2/1989 | Cella et al. | |
| 4,826,916 A | 5/1989 | Policastro et al. | |
| 4,848,869 A | 7/1989 | Urruti | |
| 4,941,729 A | 7/1990 | Hardin | |
| 4,960,837 A | 10/1990 | Alesbury | |
| 4,981,894 A | 1/1991 | Nye et al. | |
| 5,026,890 A | 6/1991 | Webb et al. | |
| 5,028,681 A | 7/1991 | Peters | |
| 5,074,640 A | 12/1991 | Hardin | |
| 5,104,958 A | 4/1992 | Bolon et al. | |
| 5,106,915 A | 4/1992 | Rock et al. | |
| 5,202,946 A | 4/1993 | Hardin et al. | |
| 5,209,981 A | 5/1993 | Rojstaczer | |
| 5,253,317 A | 10/1993 | Allen et al. | |
| 5,280,085 A | 1/1994 | Rock et al. | |
| 5,385,970 A | 1/1995 | Gallucci et al. | |
| 5,437,930 A | 8/1995 | Redondo et al. | |
| 5,552,222 A | 9/1996 | Bolon et al. | |
| 5,644,105 A * | 7/1997 | Castellani | 174/110 SR |
| 5,660,932 A | 8/1997 | Durston | |
| 5,935,372 A | 8/1999 | Rojstaczer et al. | |
| 6,110,592 A * | 8/2000 | Grizante et al. | 428/375 |
| 6,140,411 A | 10/2000 | Schwamborn et al. | |
| 6,156,820 A | 12/2000 | Choi | |
| 6,214,462 B1 | 4/2001 | Andre et al. | |
| 6,297,341 B1 | 10/2001 | Ueki et al. | |
| 6,339,137 B1 | 1/2002 | Biggs et al. | |
| 6,353,073 B1 | 3/2002 | Biggs et al. | |
| 6,876,807 B2 | 4/2005 | Lanier et al. | |
| 2003/0057601 A1 | 3/2003 | Reitz et al. | |
| 2005/0143534 A1 | 6/2005 | Dueber et al. | |

(Continued)

FOREIGN PATENT DOCUMENTS

DE 19737309 * 3/1999

(Continued)

OTHER PUBLICATIONS

Rous et al., CAPLUS AN 1999:162305, Mar. 1999.*

(Continued)

*Primary Examiner*—Jeffrey C Mullis
(74) *Attorney, Agent, or Firm*—Cantor Colburn LLP

(57) ABSTRACT

A thermoplastic composition comprises a polysiloxane/polyimide block copolymer and a polyester/polyether block copolymer. The polysiloxane/polyimide block copolymer has 5 to 50 weight percent (wt %) polysiloxane, based on the total weight of the polysiloxane/polyimide block copolymer. The polyester/polyether block copolymer has 5 to 30 wt % polyether based on the total weight of the polyester/polyether block copolymer. In some embodiments the polysiloxane/polyimide block copolymer is present in an amount of 75 to 99 wt % and the polyester/polyether block copolymer is present in an amount of 1 to 25 wt %, with the weight percent of the block copolymers based on the combined weight of the two block copolymers.

19 Claims, 1 Drawing Sheet

U.S. PATENT DOCUMENTS

| | | |
|---|---|---|
| 2006/0054513 A1 | 3/2006 | Lequeux et al. |
| 2007/0298255 A1 | 12/2007 | Banerjee et al. |
| 2007/0299213 A1 | 12/2007 | Banerjee et al. |
| 2007/0299215 A1 | 12/2007 | Banerjee et al. |

FOREIGN PATENT DOCUMENTS

| | | |
|---|---|---|
| EP | 0163464 | 12/1985 |
| EP | 0254488 | 1/1988 |
| EP | 0266595 | 5/1988 |
| EP | 0273150 | 7/1988 |
| EP | 0295561 | 12/1988 |
| EP | 0323142 | 7/1989 |
| EP | 0568923 | 11/1993 |
| EP | 0822559 | 2/1998 |
| EP | 1550698 | 7/2005 |
| WO | 8700846 | 2/1987 |
| WO | 9502642 | 1/1995 |
| WO | 0026277 | 5/2000 |

OTHER PUBLICATIONS

Rous et al., electronic translation of DE 19737309, Mar. 1999.*
DE 197 38 082, Published, Mar. 4, 1999, Abstract Only, 1 page.
ASTM D1003, Standard Test Method for Haze and Luminous Transmittance of Transparent Plastics, 6 pages.
ASTM D638, Standard Test Method for Tensile Properties of Plastics, 15 pages.
ASTM D790, Standard Test Method for Flexural Properties of Unreinforced and Reinforced Plastics and Electrical Insulating Materials, 11 pages.

* cited by examiner

POLYSILOXANE/POLYIMIDE COPOLYMER BLENDS

BACKGROUND OF INVENTION

The disclosure relates to polysiloxane/polyimide block copolymers. In particular, the disclosure relates to blends comprising polysiloxane/polyetherimide block copolymers.

Polysiloxane/polyimide block copolymers have been used due to their flame resistance and high temperature stability. Polysiloxane/polyimide block copolymers generally demonstrate good ductility. However, in some applications there is a need for greater elongation and tear strength. Therefore there is an ongoing need for a polysiloxane/polyimide block copolymer composition which maintains the desired properties of flame resistance, high temperature stability, ductility and the like while also demonstrating excellent elongation and tear strength.

BRIEF DESCRIPTION OF THE INVENTION

The aforementioned need is met by a thermoplastic composition comprising a polysiloxane/polyimide block copolymer and a polyester/polyether block copolymer. The polysiloxane/polyimide block copolymer has 5 to 50 weight percent (wt %) polysiloxane, based on the total weight of the polysiloxane/polyimide block copolymer. The polyester/polyether block copolymer has 5 to 30 wt % polyether based on the total weight of the polyester/polyether block copolymer. In some embodiments the polysiloxane/polyimide block copolymer is present in an amount of 75 to 99 wt % and the polyester/polyether block copolymer is present in an amount of 1 to 25 wt %, with the weight percent of the block copolymers based on the combined weight of the two block copolymers.

DETAILED DESCRIPTION

Figure 1:
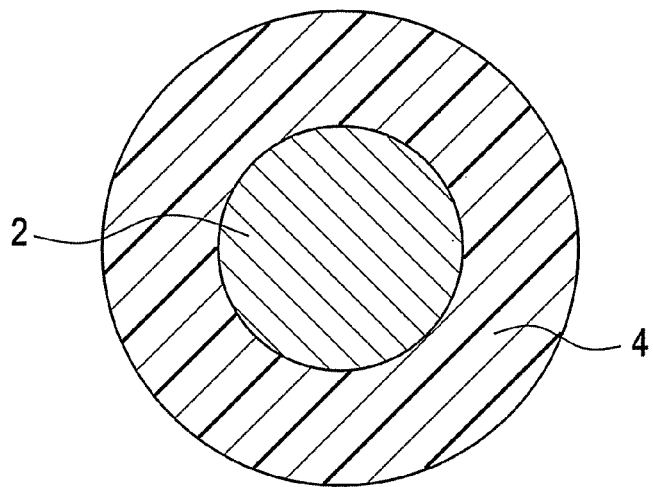
FIG. 1 is a schematic representation of a cross-section of coated wire.

Polymers can be blended to obtain a desired set of physical properties. The physical properties of a polymer blend can be surprising and difficult to predict. In some cases the addition of a small amount of a material can dramatically alter one or more physical properties. Blends of polysiloxane/polyimide block copolymers and polyester/polyether block copolymers demonstrate this fact admirably. The inclusion of only a small amount of polyester/polyether block copolymer can significantly increase the tensile elongation and tear strength of a polysiloxane/polyimide block copolymer composition. Additionally, in some embodiments the blend has the same or greater light transmittance that the polysiloxane/polyimide block copolymer alone.

Polysiloxane/polyimide block copolymer comprises repeating groups of formula (I) and formula (II):

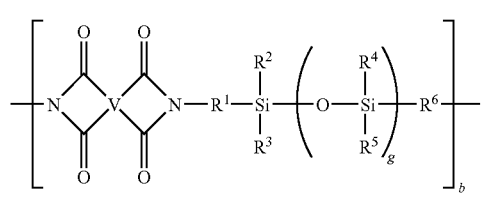

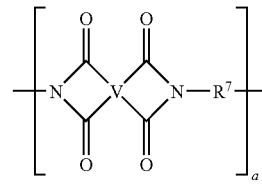

wherein "b" is an integer greater than 1, or, more specifically, 10 to 10,000; g is an integer of 1 to 40; a is more than 1, typically 10 to 1,000, and more specifically can be 10 to 500; $R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms, and substituted or unsubstituted alkenyl groups having 2 to 30 carbon atoms, and V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers.

Suitable substitutions include, but are not limited to, ethers, epoxides, amides, esters, and combinations comprising at least one of the foregoing. Exemplary linkers include, but are not limited to, tetravalent aromatic radicals of formula (III), such as:

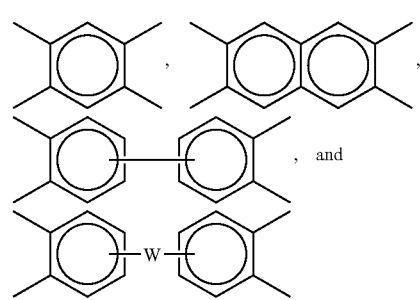

wherein W is a divalent moiety such as —O—, —S—, —C(O)—, —SO$_2$—, —SO—, —C$_y$H$_{2y}$— (y being an integer of 1 to 5), and halogenated derivatives thereof, including perfluoroalkylene groups, or a group of the formula —O—Z—O— wherein the divalent bonds of the —O— or the —O—Z—O— group are in the 3,3', 3,4', 4,3', or the 4,4' positions, and wherein Z includes, but is not limited to, divalent radicals of formula (IV):

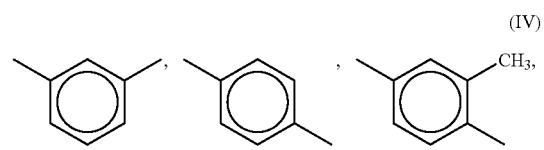

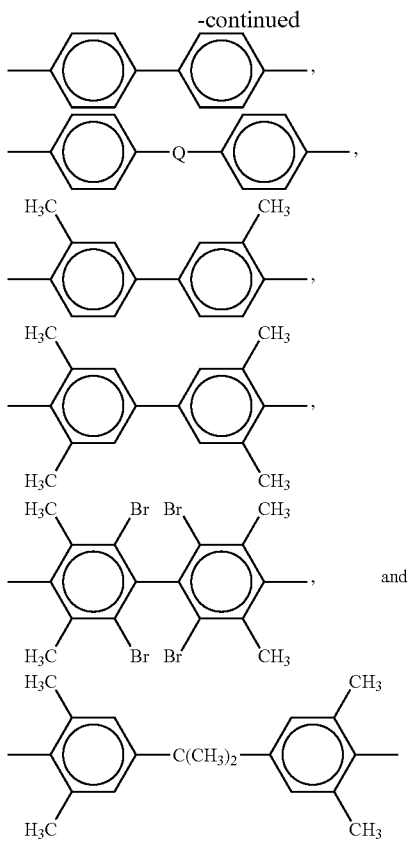

wherein Q includes, but is not limited to, a divalent moiety comprising —O—, —S—, —C(O)—, —SO₂—, —SO—, —C$_y$H$_{2y}$— (y being an integer from 1 to 5), and halogenated derivatives thereof, including perfluoroalkylene groups.

R⁷ in formula (II) includes but is not limited to substituted or unsubstituted divalent organic radicals such as: aromatic hydrocarbon radicals having about 6 to about 20 carbon atoms and halogenated derivatives thereof; straight or branched chain alkylene radicals having about 2 to about 20 carbon atoms; cycloalkylene radicals having about 3 to about 20 carbon atoms; or divalent radicals of the general formula (V)

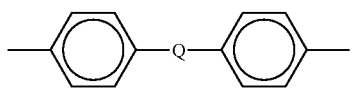

wherein Q is defined as above.

In some embodiments the polysiloxane/polyimide block copolymer is a polysiloxane/polyetherimide block copolymer comprising repeating groups of formula (VI) and (VII):

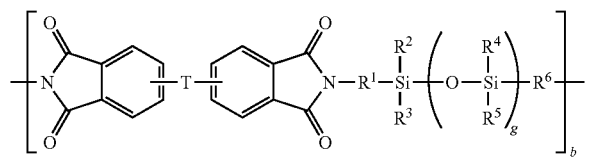

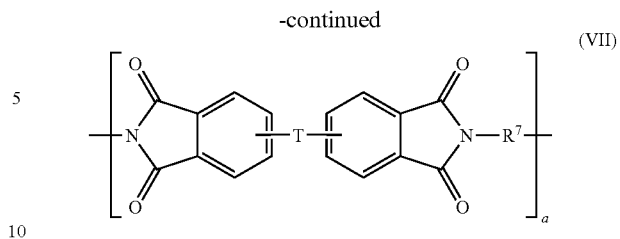

wherein T is —O—, —S—, —SO₂— or a group of the Formula —O—Z—O— wherein the divalent bonds of the —O— or the —O—Z—O— group are in the 3,3', 3,4', 4,3', or the 4,4' positions, and wherein Z, R$^{1-7}$, g, a, and b are defined as described above.

The polysiloxane/polyimide block copolymer can be prepared by various methods, including the reaction of a dianhydride with a diamino siloxane and a non-siloxane diamine.

Dianhydrides useful for forming the block copolymer have formula (VIII)

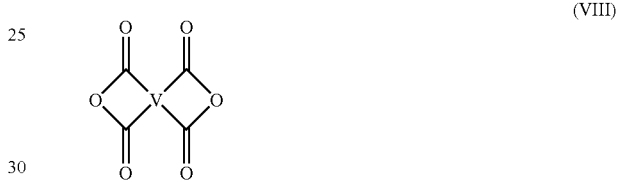

wherein V is a tetravalent linker as described above. In some embodiments the tetravalent linker V is free of halogens. Exemplary dianhydrides include bispheol A dianhydride, biphenyl dianhydrides, pyromellitic dianhydrides, oxydiphthalic anhydrides, biphenol dianhydrides, benzophenone tetra carboxylic dianhydrides and combinations of two or more of the foregoing.

In one embodiment, the dianhydride comprises an aromatic bis(ether anhydride). Examples of specific aromatic bis(ether anhydride)s are disclosed, for example, in U.S. Pat. Nos. 3,972,902 and 4,455,410. Illustrative examples of aromatic bis(ether anhydride)s include: 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as mixtures comprising two or more of the foregoing.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent.

A chemical equivalent to a dianhydride may also be used. Examples of dianhydride chemical equivalents include tetra-functional carboxylic acids capable of forming a dianhydride and ester or partial ester derivatives of the tetra functional carboxylic acids. Mixed anhydride acids or anhydride esters may also be used as an equivalent to the dianhydride. As used throughout the specification and claims "dianhydride" will refer to dianhydrides and their chemical equivalents.

Diamino siloxanes are of formula (IX)

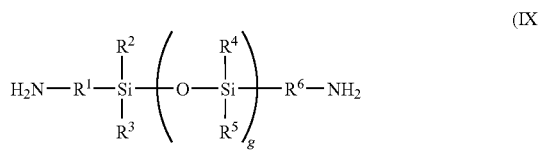

wherein $R^{1-6}$ and g are defined as above. In one embodiment $R^{2-5}$ are methyl groups and $R^1$ and $R^6$ are alkylene groups. The synthesis of diamino siloxanes is known in the art and is taught, for example, in U.S. Pat. Nos. 4,808,686, 5,026,890, 6,339,1376 and 6,353,073. In one embodiment $R^1$ and $R^6$ are alkylene groups having 3 to 10 carbons. In some embodiments $R^1$ and $R^6$ are the same and in some embodiments $R^1$ and $R^6$ are different.

Non-siloxane diamines have the Formula (X)

wherein $R^7$ is as defined above. Examples of specific organic diamines are disclosed, for example, in U.S. Pat. Nos. 3,972,902 and 4,455,410. Exemplary diamines include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro4-amino-3,5-diethylphenyl)methane, bis(4-aminophenyl)propane, 2,4-bis(p-amino-t-butyl)toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl)sulfide, bis(4-aminophenyl) sulfone, bis(4-aminophenyl)ether and 1,3-bis(3-aminopropyl) tetramethyldisiloxane. Mixtures of these compounds may also be used. In one embodiment the diamine is an aromatic diamine. In one embodiment the diamine is m-phenylenediamine, p-phenylenediamine, a sulfonyl dianiline, an oxydianiline, a bisaminophenoxy phenyl sulfone, a methylene dianiline, a bisaminophenoxy benzene or a combination or two or more of the foregoing.

The diaminosiloxane and non-siloxane diamine may be physically mixed prior to reaction with the dianhydride, thus forming a substantially random block copolymer. Alternatively, a non-random block copolymer may be formed by forming prepolymers or sequential addition of reactants.

In general, the reactions can be carried out employing various solvents, e.g., o-dichlorobenzene, m-cresol/toluene, and the like, to effect a reaction between the dianhydride and the diamines at temperatures of about 100° C. to about 250° C. Alternatively, the copolymer can be prepared by melt polymerization or interfacial polymerization, e.g., melt polymerization of dianhydride and diamines by heating a mixture of the starting materials to elevated temperatures with concurrent stirring. Generally, melt polymerizations employ temperatures of about 200° C. to about 400° C. Chain stoppers and branching agents may also be employed in the reaction. The diamine is present in the reaction mixture at less than or equal to 0.2 molar excess, or, more specifically, less than 0.2 molar excess.

Polysiloxane/polyimide block copolymers comprise polysiloxane blocks and polyimide blocks. In random polysiloxane/polyimide block copolymers the size of the siloxane block is determined by the number of siloxy units (analogous to g in formula (I)) in the monomer used to form the block copolymer. In some non-random polysiloxane/polyimide block copolymers the order of the polyimide blocks and polysiloxane blocks is determined but the size of the siloxane block is still determined by the number of siloxy units in the monomer. In contrast, the polysiloxane/polyimide block copolymers described herein have extended siloxane blocks. Two or more siloxane monomers are linked together to form an extended siloxane oligomer which is then used to form the block copolymer.

In some embodiments the polysiloxane/polyimide block copolymer comprises extended block repeating units of formula (XI)

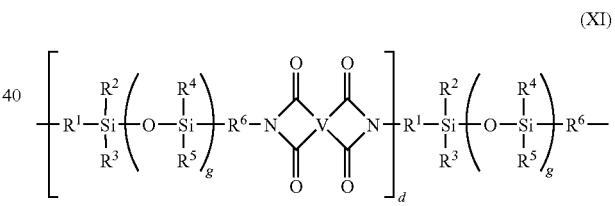

wherein $R^{1-6}$, V, and g are defined as above and d is greater than or equal to 1.

Polysiloxane/polyimide block copolymers having extended siloxane blocks are made by forming an extended siloxane oligomer and then using the extended siloxane oligomer to make the block copolymer. The extended siloxane oligomer is made by reacting a diamino siloxane and a dianhydride wherein either the diamino siloxane or the dianhydride is present in 10 to 50% molar excess, or, more specifically, 10 to 25% molar excess. "Molar excess" as used in this context is defined as being in excess of the other reactant. For example, if the diamino siloxane is present in 10% molar excess then for 100 moles of dianhydride are present there are 110 moles of diamino siloxane.

The diamino siloxane and dianhydride can be reacted in a suitable solvent, such as a halogenated aromatic solvent, for example orthodichlorobenzene, optionally in the presence of a polymerization catalyst such as an alkali metal aryl phosphinate or alkali metal aryl phosphonate, for example, sodium phenylphosphonate. In some instances the solvent will be an aprotic polar solvent with a molecular weight less than or equal to 500 to facilitate removal of the solvent from the polymer. The temperature of the reaction can be greater than or equal to 100° C. and the reaction may run under azeotropic conditions to remove the water formed by the reaction. In some embodiments the polysiloxane/polyimide block copolymer has a residual solvent content less than or equal to 500 parts by weight of solvent per million parts by weight of polymer (ppm), or, more specifically, less than or equal to 250 ppm, or, even more specifically, less than or equal to 100 ppm. Residual solvent content may be determined by a number of methods including, for example, gas chromatography.

The stoichiometric ratio of the diamino siloxane and dianhydride in the reaction to form the siloxane oligomer determines the degree of chain extension, (d in Formula (XI)+1) in the extended siloxane oligomer. For example, a stoichiometric ratio of 4 diamino siloxane to 6 dianhydride will yield a siloxane oligomer with a value for d+1 of 4. As understood by one of ordinary skill in the art, d+1 is an average value for the siloxane containing portion of the block copolymer and the value for d+1 is generally rounded to the nearest whole number. For example a value for d+1 of 4 includes values of 3.5 to 4.5.

In some embodiments d is less than or equal to 50, or, more specifically, less than or equal to 25, or, even more specifically, less than or equal to 10.

The extended siloxane oligomers described above are further reacted with non-siloxane diamines and additional dianhydrides to make the polysiloxane/polyimide block copolymer. The overall molar ratio of the total amount of dianhydride and diamine (the total of both the siloxane and non-siloxane containing diamines) used to make the polysiloxane/polyimide block copolymer should be about equal so that the copolymer can polymerize to a high molecule weight. In some embodiments the ratio of total diamine to total dianhydride is 0.9 to 1.1, or, more specifically 0.95 to 1.05. In some embodiments the polysiloxane/polyimide block copolymer will have a number average molecular weight (Mn) of 5,000 to 50,000 Daltons, or, more specifically, 10,000 to 30,000 Daltons. The additional dianhydride may be the same or different from the dianhydride used to form the extended siloxane oligomer.

The non-siloxane polyimide block comprises repeating units having the formula (II) described above.

The polysiloxane/polyimide block copolymer may be made by first forming the extended siloxane oligomer and then further reacting the extended siloxane oligomer with non-siloxane diamine and dianhydride. Alternatively a non-siloxane diamine and dianhydride may be reacted to form a polyimide oligomer. The polyimide oligomer and extended siloxane oligomer can be reacted to form the polysiloxane/polyimide block copolymer.

When using a polyimide oligomer and an extended siloxane oligomer to form the block copolymer, the stoichiometric ratio of terminal anhydride functionalities to terminal amine functionalities is 0.90 to 1.10, or, more specifically, 0.95 to 1.05. In one embodiment the extended siloxane oligomer is amine terminated and the non-siloxane polyimide oligomer is anhydride terminated. In another embodiment, the extended siloxane oligomer is anhydride terminated and the non-siloxane polyimide oligomer is amine terminated. In another embodiment, the extended siloxane oligomer and the non-siloxane polyimide oligomer are both amine terminated and they are both reacted with a sufficient amount of dianhydride (as described above) to provide a copolymer of the desired molecular weight. In another embodiment, the extended siloxane oligomer and the non-siloxane polyimide oligomer are both anhydride terminated and they are both reacted with a sufficient amount of diamine (as described above) to provide a copolymer of the desired molecular weight. Reactions conditions for the polymerization of the siloxane and polyimide oligomers are similar to those required for the formation of the oligomers themselves and can be determined without undue experimentation by one of ordinary skill in the art.

The polysiloxane/polyimide block copolymer has a siloxane content of 5 to 50 weight percent, or, more specifically, 5 to 30 weight percent, based on the total weight of the block copolymer. In some embodiments the polysiloxane block of the copolymer has a number average molecular weight (Mn) of 300 to 3000.

The thermoplastic composition may comprise a blend of two or more polysiloxane/polyimide block copolymers. The block copolymers may be used in any proportion. For example, when two block copolymers are used the weight ratio of the first block copolymer to the second block copolymer may be 1 to 99. Ternary blends and higher are also contemplated.

The polysiloxane/polyimide block copolymer is present in an amount of 75 to 99 weight percent, or, more specifically, in an amount of 90 to 99 weight percent, based on the combined weight of the polysiloxane/polyimide block copolymer and the polyester/polyether block copolymer.

Polyester/polyether block copolymers consists essentially of (a) long-chain ester units having formula (XII):

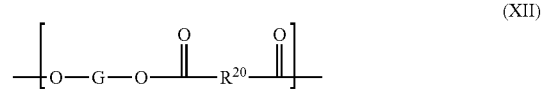

(XII)

wherein G is a divalent radical remaining after removal of the terminal hydroxyl groups from a poly(alkylene oxide)glycol having a number-average molecular weight of 400 to 6000; and $R^{20}$ is a divalent radical remaining after removal of the carboxyl groups from a dicarboxylic acid; and (b) short-chain ester units having the formula (XIII):

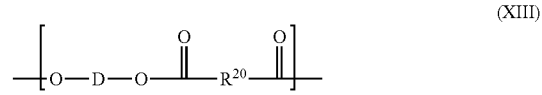

(XIII)

wherein D is a divalent radical remaining after removal of the hydroxyl groups from a low molecular weight diol having a molecular weight of less than or equal to 300; and $R^{20}$ is as defined above; with the proviso that the short-chain ester units constitute about 40% to about 90% by weight of the polyester/polyether block copolymer, and the long-chain ester units constitute about 10% to about 60% by weight of the polyester/polyether block copolymer.

Polyester/polyether block copolymers are well known and are available from several sources. One example is the Hytrel® resins from E. I. DuPont.

In general, polyester/polyether block copolymers are prepared by conventional esterification/polycondensation processes from one or more diols, one or more dicarboxylic acids, one or more long chain ether glycols, and optionally, one or more caprolactones or polycaprolactones.

Diols which can be used in the preparation of the polyester/polyether block copolymers include both saturated and unsaturated aliphatic and cycloaliphatic dihydroxy compounds as well as aromatic compounds. These diols have a low molecular weight, i.e., having a molecular weight of less than or equal to 300. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Exemplary saturated and unsaturated aliphatic and cycloaliphatic diols are those having up to 19 carbon atoms. These diols include ethylene glycol; propanediol; butanediol; pentanediol; 2-methyl propanediol; 2,2-dimethyl propanediol; hexanediol; decanediol; 2-octyl undecanediol; 1,2-, 1,3-and 1,4-dihydroxy cyclohexane; and 1,2-1,3-and 1,4-cyclohexane dimethanol. In one embodiment the diol comprises 1,4-butanediol and mixtures thereof with hexanediol or butenediol.

Suitable aromatic diols are generally those having 6 to 19 carbon atoms. Included among the aromatic diols are resorcinol; hydroquinone; 1,5-dihydroxy naphthalene; 4,4'-dihydroxy diphenyl; bis(p-hydroxy phenyl)methane and 2,2-bis (p-hydroxy phenyl)propane.

In some embodiments the diol comprises a saturated aliphatic diol, mixtures of saturated diols, or mixtures of a saturated diol with an unsaturated diol, wherein each diol contains from 2 to about 8 carbon atoms. Where more than one diol is employed, greater than or equal to 60 mole %, or, more specifically, greater than or equal to 80 mole %, based on the total diol content, is the same diol. In some embodiments 1,4-butanediol is present in a predominant amount.

Useful dicarboxylic acids include aliphatic dicarboxylic acids, cycloaliphatic dicarboxylic acids, aromatic dicarboxylic acids, and combinations of two or more of the foregoing. These acids can have a low molecular weight, i.e., a molecular weight of less than or equal to 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include ester and ester-forming derivatives, such as acid halides and anhydrides. Additionally, the dicarboxylic acids may contain any substituent group(s) or combinations which do not substantially interfere with the polymer formation and use of the polymer.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic dicarboxylic acids which can be used include, but are not limited to, sebacic acid; 1,2-cyclohexane dicarboxylic acid; 1,3-cyclohexane dicarboxylic acid; 1,4-cyclohexane dicarboxylic acid; adipic acid; glutaric acid; succinic acid; oxalic acid; azelaic acid; diethylmalonic acid; allylmalonic acid; dimer acid; 4-cyclohexene-1,2-dicarboxylic acid; 2-ethylsuberic acid; tetramethylsuccinic acid; cyclopentane dicarboxylic acid; decahydro-1,5-naphthalene dicarboxylic acid; 4,4'-bicyclohexyl dicarboxylic acid; decahydro-2,6-naphthalene dicarboxylic acid; 4,4 methylenebis-(cyclohexane carboxylic acid); 3,4-furan dicarboxylic acid; and 1,1-cyclobutane dicarboxylic acid. Aliphatic acids also include are cyclohexane dicarboxylic acids, sebacic acid, dimer acid, glutaric acid, azelaic acid, adipic acid, and combinations of two or more of the foregoing.

Representative aromatic dicarboxylic acids which can be used include terephthalic; phthalic and isophthalic acids; bibenzoic acid; substituted dicarboxy compounds with two benzene nuclei such as bis(p-carboxyphenyl)methane; oxybis(benzoic acid); ethylene-1,2-bis-(p-oxygenzoic acid); 1,5-naphthalene dicarboxylic acid; 2,6-naphthalene dicarboxylic acid; 2,7-naphthalene dicarboxylic acid; phenanthrene dicarboxylic acid; anthracene dicarboxylic acid; 4,4'-sulfonyl dibenzoic acid, and halo and $C_1$-$C_{12}$ allkyl; alkoxy; and aryl ring substitution derivatives thereof. Combinations of two or more of the foregoing aromatic dicarboxylic acids may also be used. Hydroxy acids such as p(p-hydroxyethoxy) benzoic acid can also be used provided an aromatic dicarboxylic acid is also present.

In some embodiments dicarboxylic acids for the preparation of the polyester/polyether block copolymers are the aromatic dicarboxylic acids, mixtures thereof and mixtures of one or more aromatic dicarboxylic acid with an aliphatic and/or cycloaliphatic dicarboxylic acid. In some embodiments the aromatic acids with 8-16 carbon atoms, for example the benzene dicarboxylic acids, i.e., phthalic, terephthalic and isophthalic acids and their dimethyl ester derivatives, are used.

Finally, in some embodiments where mixtures of dicarboxylic acids are employed, greater than or equal to 60 mole %, or, more specifically, greater than or equal to 80 mole %, based on 100 mole % of dicarboxylic acid is the same dicarboxylic acid or ester derivative thereof. In some embodiments dimethylterephthalate is the predominant dicarboxylic acid.

In some embodiments the polyester portion of the polyester/polyether block copolymer is derived from the esterification reaction of an aromatic dicarboxylic acid and a diol. The aromatic dicarboxylic acid can comprise isophthalic acid, terephthalic acid, napthalene dicarboxylic acid, cyclohexane dicarboxylic acid or a combination of two or more of the foregoing. The diol can comprise a butane diol, propane diol, ethane diol, cyclohexane diol, or a combination of two or more of the foregoing.

The polyester segments may show a crystalline behavior with a distinct melting point.

Suitable long chain ether glycols which can be used in the preparation of the polyester/polyether block copolymers include poly(oxyallcylene)glycols and copoly(oxyallclene) glycols having a molecular weight of 1,000 to 10,000. In some embodiments the poly(oxyallcylene) units are derived from long chain ether glycols having a molecular weight of 1,000 to 4,000 and a carbon-to-oxygen ratio of 1.8 to 4.3, exclusive of any side chains. The polyether portion of the polyester/polyether block copolymer can have a number average molecular weight (Mn) of 1,000 to 10,000, or, more specifically, 1,000 to 4,000.

Representative of suitable poly(oxyalkylene)glycols are poly(ethylene ether)glycol; poly(propylene ether)glycol; poly(butylene ether)glycol; random or block copolymers of ethylene oxide and propylene oxide, including ethylene oxide end capped poly(propylene ether)glycol and predominately poly(ethylene ether)backbone, copoly(propylene ether-ethylene ether)glycol; and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. In some embodiments the poly(oxyalkylene)glycol can be poly(propylene ether)glycol, poly(butylene ether)glycol, predominantly poly(ethylene ether) backbone copoly(propylene ether-ethylene ether)glycol, and combinations of two or more of the foregoing.

The polyether portion of the polyester/polyether block copolymer can comprise polybutylene ether, polypropylene ether, polyethylene ether, polyether copolymers comprising two or more of butylene ether, propylene ether, and ethylene ether, and combinations of two or more of the foregoing.

The long chain ether glycol (polyether) content in the polyester/polyether block copolymer can be 5 to 30, or, more specifically, 5 to 25 weight percent based on the total weight of the block copolymer. In some embodiments the polyester/polyether block copolymer comprises 3 to 30 weight percent polybutylene ether based on the total weight of the copolymer.

As described above, the polyester/polyether block copolymers may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547. These polyester/polyether block copolymers may be prepared by such processes and other known processes to effect block copolymers or hybrids wherein both random and block units are present. For example, it is possible that any two or more of the foregoing monomers/reactants may be prereacted prior to polymerization of the final polyester/polyether block copolymer. Alternatively, a two-part synthesis may be employed wherein two different diols and/or dicarboxylic acids are each prereacted in separated reactors to form two low molecular weight prepolymers which are then combined with the long chain ether glycol to form a final tri-block polyester/polyether block copolymers.

The thermoplastic composition may have a halogenated solvent content of less than or equal to 300 parts by weight of solvent per million parts by weight of composition (ppm), or, more specifically, less than or equal to 200 ppm, or, even more specifically, less than or equal to 100 ppm wherein the halogenated solvent has a molecular weight of 110 to 600.

In some embodiments the thermoplastic composition is halogen free. Halogen free is defined as having a halogen content less than or equal to 1000 parts by weight of bromine or chlorine per million parts by weight of thermoplastic composition (ppm). The amount of bromine or chlorine can be determined by ordinary chemical analysis such as atomic absorption.

In some embodiments, a thermoplastic composition comprises a first polysiloxane/polyimide block copolymer having a first siloxane content, based on the total weight of the first block copolymer, and a second polysiloxane/polyimide block copolymer having a second siloxane content, based on the total weight of the second block copolymer, wherein the first siloxane content does not equal the second siloxane content.

The blends may further contain fillers and reinforcements for example fiber glass, milled glass, glass beads, carbon black, glass flake, and the like. Minerals such as talc, wollastonite, titanium dioxide, mica, kaolin or montmorillonite clay, silica, quartz, barite, and combinations of two or more of the foregoing may be added. The compositions can comprise inorganic fillers, such as, for example, carbon fibers and nanotubes, metal fibers, metal powders, conductive carbon black, and other additives including nano-scale reinforcements as well as combinations of inorganic fillers. In some embodiments the thermoplastic composition comprises 1 to 5 weight percent of silica, titanium dioxide, carbon black, or a combination of two or more of the foregoing. Weight percent is based on the combined weight of the polysiloxane/polyimide block copolymer and polyester/polyether block copolymer.

Other additives include, UV absorbers; stabilizers such as light stabilizers and others; lubricants; plasticizers; pigments; dyes; colorants; anti-static agents; foaming agents; blowing agents; metal deactivators, and combinations comprising one or more of the foregoing additives. Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers may have a molecular weight greater than or equal to 300. In some embodiments, phosphorus containing stabilizers with a molecular weight greater than or equal to 500 are useful. Phosphorus containing stabilizers are typically present in the composition at 0.05 to 0.5% by weight of the formulation. Flow aids and mold release compounds are also contemplated.

The thermoplastic composition can be prepared melt mixing or a combination of dry blending and melt mixing. Melt mixing can be performed in single or twin screw type extruders or similar mixing devices which can apply a shear and heat to the components. Melt mixing can be performed at temperatures greater than or equal to the melting temperatures of the block copolymers and less than the degradation temperatures of either of the block copolymers.

All of the ingredients may be added initially to the processing system. In some embodiments, the ingredients may be added sequentially or through the use of one or more master batches. It can be advantageous to apply a vacuum to the melt through one or more vent ports in the extruder to remove volatile impurities in the composition.

In one embodiment the composition comprises a reaction product of melt mixing the block copolymers.

In some embodiments melt mixing is performed using an extruder and the composition exits the extruder in a strand or multiple strands. The shape of the strand is dependent upon the shape of the die used and has no particular limitation.

The thermoplastic composition can have a flexural modulus of 150 to 1,200, or, more specifically, 350 to 1,200 megaPascals (MPa) as determined by ASTM D790 at 3.2 millimeters (mm).

The thermoplastic composition can have a percent transmission (% T) of greater than or equal to 40% as determined by ASTM D1003 at a wavelength of 700 nanometers and a thickness of 3.2 millimeters. The % T can be less than or equal to 85%.

The thermoplastic composition can have tensile elongation at break of greater than or equal to 20% as determined by ASTM D638. The elongation at break can be less than or equal to 500%.

In one embodiment the thermoplastic composition is extruded or otherwise molded to form an article such as a tube or coated wire.

In one embodiment, a coated wire comprises a conductor and a covering disposed over the conductor. The covering comprises a thermoplastic composition and the thermoplastic composition comprises a polysiloxane/polyimide block copolymer and a polyester/polyether block copolymer as described above. The composition is applied to the conductor by a suitable method such as extrusion coating to form a coated wire. For example, a coating extruder equipped with a screw, crosshead, breaker plate, distributor, nipple, and die can be used. The melted thermoplastic composition forms a covering disposed over a circumference of the conductor. Extrusion coating may employ a single taper die, a double taper die, other appropriate die or combination of dies to position the conductor centrally and avoid die lip build up.

In some embodiments it may be useful to dry the thermoplastic composition before extrusion coating. Exemplary drying conditions are 60 to 90° C. for 2 to 20 hours. Additionally, in one embodiment, during extrusion coating, the thermoplastic composition is melt filtered, prior to formation of the coating, through one or more filters. In some embodiments the thermoplastic composition will have substantially no particulates greater than 80 micrometers in size. In some embodiments any particulates present will be less than or equal to 40 micrometers in size. In some embodiments there will be substantially no particulates greater than 20 micrometers in size. The presence and size of particulates can be determined using a solution of 1 gram of thermoplastic composition dissolved in 10 milliliters of a suitable solvent and analyzing it using microscopy or light scattering techniques. Substantially no particulates is defined as having less than or equal to 3 particulates, or, more specifically, less than or equal to 2 particulates, or, even more specifically, less than or equal to 1 particulate per one gram sample. Low levels of particulates are beneficial for giving a layer of insulation on a coated wire that will not have electrically conductive defects as well as giving coatings with improved mechanical properties, for instance elongation.

The extruder temperature during extrusion coating is generally less than the degradation temperature of the block copolymers. Additionally the processing temperature is adjusted to provide a sufficiently fluid molten composition to afford a covering for the conductor, for example, higher than the softening point of the thermoplastic composition, or more specifically at least 30° C. higher than the melting point of the thermoplastic composition.

After extrusion coating the coated wire is usually cooled using a water bath, water spray, air jets or a combination comprising one or more of the foregoing cooling methods. Exemplary water bath temperatures are 20 to 85° C.

In one embodiment, the composition is applied to the conductor to form a covering disposed over and in physical contact with the conductor. Additional layers may be applied to the covering. Methods of coating a conductor which may be used are well known in the art and are discussed for example in U.S. Pat. No. 4,588,546 to Feil et al.; U.S. Pat. No. 4,038,237 to Snyder et al.; U.S. Pat. No. 3,986,477 to Bigland et al.; and, U.S. Pat. No. 4,414,355 to Pokorny et al.

In one embodiment the composition is applied to a conductor having one or more intervening layers between the conductor and the covering to form a covering disposed over the conductor. For instance, an optional adhesion promoting layer may be disposed between the conductor and covering. In another example the conductor may be coated with a metal deactivator prior to applying the covering. Alternatively, a metal deactivator can be mixed with the polysiloxane/polyimide block copolymers. In another example the intervening layer comprises a thermoplastic or thermoset composition that, in some cases, is foamed.

The conductor may comprise a single strand or a plurality of strands. In some cases, a plurality of strands may be bundled, twisted, braided, or a combination of the foregoing to form a conductor. Additionally, the conductor may have various shapes such as round or oblong. Suitable conductors include, but are not limited to, copper, aluminum, lead, gold, silver, iron, nickel, chromium, and alloys comprising one or more of the foregoing metals. The conductor may also be coated with, e.g., tin, gold or silver. In some embodiments the conductor comprises optical fibers.

The cross-sectional area of the conductor and thickness of the covering may vary and is typically determined by the end use of the coated wire. The coated wire can be used as coated wire without limitation, including, for example, for harness wire for automobiles, wire for household electrical appliances, wire for electric power, wire for instruments, wire for information communication, wire for electric cars, as well as ships, airplanes, and the like.

In some embodiments the covering may have a thickness of 0.01 to 10 millimeters (mm) or, more specifically, 0.05 to 5 mm, or, even more specifically 1 to 3 mm.

Figure 2:
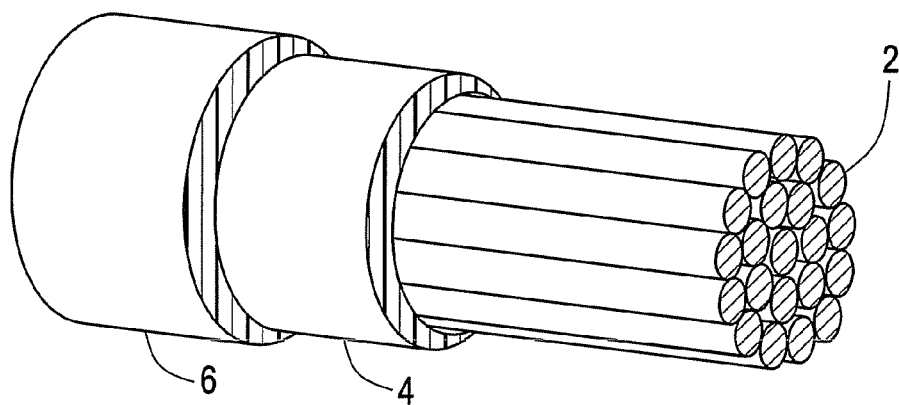
FIGS. 2 and 3 are perspective views of a coated wire having multiple layers.
Figure 3:
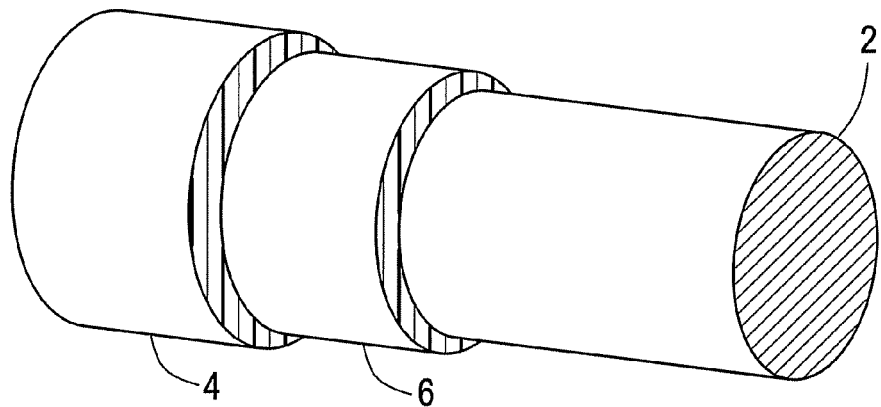

A cross-section of an exemplary coated wire is seen in FIG. 1. FIG. 1 shows a covering, 4, disposed over a conductor, 2. In one embodiment, the covering, 4, comprises a foamed thermoplastic composition. Perspective views of exemplary coated wires are shown in FIGS. 2 and 3. FIG. 2 shows a covering, 4, disposed over a conductor, 2, comprising a plurality of strands and an optional additional layer, 6, disposed over the covering, 4, and the conductor, 2. In one embodiment, the covering, 4, comprises a foamed thermoplastic composition. Conductor, 2, can also comprise a unitary conductor. FIG. 3 shows a covering, 4, disposed over a unitary conductor, 2, and an intervening layer, 6. In one embodiment, the intervening layer, 6, comprises a foamed composition. Conductor, 2, can also comprise a plurality of strands.

Multiple coated wires may be combined to form a cable. The cable may comprise additional protective elements, structural elements, or a combination thereof. An exemplary protective element is a jacket which surrounds the group of coated wires. The jacket and the covering on the coated wires, singly or in combination, may comprise the thermoplastic composition described herein. A structural element is a typically non conductive portion which provides additional stiffness, strength, shape retention capability or the like.

A color concentrate or master batch may be added to the composition prior to or during extrusion coating. When a color concentrate is used it is typically present in an amount less than or equal to 3 weight percent, based on the total weight of the composition. In one embodiment the master batch comprises a polysiloxane/polyimide block copolymer.

Further information is provided by the following non-limiting examples.

EXAMPLES

Examples 1-10

For each example a polysiloxane/polyimide block copolymer or a polysiloxane/polyimide block copolymer and a polyester/polyether block copolymer were melt mixed in the amounts as shown in Table 1. All ingredients were melt mixed on a vacuum vented ZSK twin screw extruder at 250 rpm with temperatures set at 280 to 310° C. Test samples were injection molded on a 100 ton injection molding machine with the highest barrel temperature and nozzle temperature set at 320° C. with a mold temperature of 100 to 120° C. The polysiloxane/polyimide block copolymer (PSi/PEI) was a blend of two block copolymers. The blend contained 60 wt %, based on the total weight of the blend, of a polysiloxane/polyimide extended block copolymer having 20 wt % siloxane content, based on the total weight of the copolymer. The blend also contained 40 wt %, based on the total weight of the blend, of a polysiloxane/polyimide extended block copolymer having 34 wt % siloxane content, based on the total weight of the copolymer. The two copolymers used in the blend are commercially available as SILTEM® STM1700 and SILTEM® STM1500 from GE Plastics. Polyester/polyether block copolymer 1 (PE-PE 1) was an isoterephthalate butanediol polyester copolymer with about 45 wt % poly oxybutylene ether segments. It had a melting temperature (Tm) of about 148° C. It is commercially available as Hytrel® 4056 from E.I. DuPont. Polyester/polyether block copolymer 2 (PE-PE 2) was a terephthalate butanediol polyester copolymer with about 30 wt % poly oxybutylene ether segments. It had Tm of about 200° C. It is commercially available as Hytrel® 5555 from E.I. DuPont. Polyester/polyether block copolymer 3(PE-PE 3) was a terephthalate butanediol polyester copolymer with about 20 wt % poly oxybutylene ether segments. It had Tm of about 219° C. It is commercially available as Hytrel® 7426 from E.I. DuPont.

The compositions were tested for the following physical properties: percent transmission (% T) according to ASTM D1003 at a thickness of 3.2 millimeters and a wavelength of 700 nanometers, flexural modulus (F. Mod.) and flexural strength (F. Str.) according to ASTM D790 at a thickness of 3.2 mm, and tensile modulus (T. Mod.), tensile strength at yield (T. Str.) and tensile elongation at break (% E) according to ASTM D638. Results for flexural strength, flexural modulus, tensile modulus and tensile strength are in megaPascals (MPa).

causes a rapid drop in % T giving hazy and opaque materials. Polyester/polyether block copolymer 1 and polyester/polyether block copolymer 2 both have greater than or equal to 30 weight percent polyether. On the other hand Examples 8-10 have % T of greater than 35%, even with as much as 7 weight percent of polyester/polyether block copolymer 3 added. Examples 8-10 use a polyester/polyether block copolymer with less than 30 weight percent polyether.

The blends of polyetherimide-siloxane (PEI-PS) with polyester/polyether (PE-PE) show improved resistance to tearing compared to the unblended polyetherimide-siloxane. As measured on 2 mm samples using the ISO-34 method, the tear strength of PSi/PEI of control example 1 is 12.5 kiloNewtons per meter (kN/meter), with added PE-PE-3 at 5 wt % (Example 9) tear strength is increased 17% to 14.6 kN/meter. In Example 10 with 7 wt % PE-PE-3 added to the polyetherimde-siloxane, tear strength is further increased by 63% to 20.4 kN/m.

The terms "first," "second," and the like, "primary," "secondary," and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The various embodiments described herein may be used individually or in combination with other embodiments.

The term "alkyl" is intended to include both $C_{1-30}$ branched and straight-chain, unsaturated aliphatic hydrocarbon groups

TABLE 1

| | Examples | | | | | | | | | |
|---|---|---|---|---|---|---|---|---|---|---|
| | 1* | 2 | 3 | 4 | 5 | 6 | 7 | 8 | 9 | 10 |
| PSi/PEI | 100 | 99 | 95 | 93 | 99 | 95 | 93 | 99 | 95 | 93 |
| PE—PE-1 | — | 1 | 5 | 7 | — | — | — | — | — | — |
| PE—PE-2 | — | — | — | — | 1 | 5 | 7 | — | — | — |
| PE—PE-3 | — | — | — | — | — | — | — | 1 | 5 | 7 |
| % T | 39.2 | 31.2 | 9.3 | 5.8 | 38.7 | 18.7 | 10.7 | 40.2 | 37.2 | 36.3 |
| F. Mod. MPa | 1200 | 991 | 849 | 764 | 902 | 878 | 940 | 1123 | 1121 | 930 |
| F. Str. MPa | 46.5 | 37.3 | 33.7 | 30.5 | 34.9 | 34.7 | 35.3 | 44.1 | 43.0 | 38.8 |
| T. Mod MPa | 1159 | 1107 | 959 | 1036 | 1020 | 1019 | 1185 | 1167 | 1164 |
| T. Str. (Y) MPa | 33.1 | 34.3 | 29.3 | 30.7 | 34.7 | 35.0 | 31.7 | 31.7 | 31.5 | 31.1 |
| % Elong (B) | 14 | 17 | 13 | 20 | 21 | 26 | 31 | 28 | 47 | 53 |

*Comparative Example

Example 1, a comparative example that does not contain a polyester/polyether block copolymer, has a tensile elongation at break of 14%. Examples 2 to 4 show that the addition of a polyester/polyether having a polyether content of 45 weight percent improves the tensile elongation of the blend only slightly. In contrast, Examples 5 to 7, show that the addition of a polyester/polyether block copolymer with 30 weight percent polyether increases the tensile elongation of the blend significantly, particularly with the inclusion of 5 and 7 weight percent of polyester/polyether block copolymer. Examples 8-10 show that the inclusion of a polyester/polyether block copolymer having 20 weight percent polyester/polyether block copolymer more than doubles the tensile elongation of the blend when compared to the tensile elongation of the polysiloxane/polyetherimide block copolymer alone.

Additionally, Example 1 has a % T of 39.2%. As shown in Examples 3-4 and 5-7 the addition of polyester/polyether block copolymer 1 or polyester/polyether block copolymer 2 having the specified number of carbon atoms. Examples of alkyl include but are not limited to, methyl, ethyl, n-propyl, i-propyl, n-butyl, s-butyl, t-butyl, n-pentyl, s-pentyl, n- and s-hexyl, n-and s-heptyl, and, n- and s-octyl.

The term "alkenyl" is defined as a $C_{2-30}$ branched or straight-chain unsaturated aliphatic hydrocarbon groups having one or more double bonds between two or more carbon atoms. Examples of alkenyl groups include ethenyl, propenyl, butenyl, pentenyl, hexenyl, heptenyl, octenyl and nonenyl and the corresponding $C_{2-10}$ dienes, trienes and quadenes.

The term "alkynyl" is defined as a $C_{2-10}$ branched or straight-chain unsaturated aliphatic hydrocarbon groups having one or more triple bonds between two or more carbon atoms. Examples of alkcynes include ethynyl, propynyl, butynyl, pentynyl, hexynyl, heptynyl, octynyl and nonynyl.

The term "substituted" means that one or more hydrogens on the molecule, portion of the molecule, or atom are replaced with substitution groups provided that an atom's normal valency is not exceeded, and that the substitution results in a stable compound. Such "substitution groups" may be selected from the group consisting of:, —OR, —NR'R, , —C(O)R, —SR, -halo, —CN, —NO$_2$, —SO$_2$, phosphoryl, imino, thioester, carbocyclic, aryl, heteroaryl, alkyl, alkenyl, bicyclic and tricyclic groups. When a substitution group is a keto (i.e., =O) group, then 2 hydrogens on the atom are replaced. Keto substituents are not present on aromatic moieties. The terms R and R' refer to alkyl groups that may be the same or different.

The description is intended to include all permutations and combinations of the substitution groups on the backbone units specified by Formulas I above with the proviso that each permutation or combination can be selected by specifying the appropriate R or substitution groups.

Thus, for example, the term "substituted $C_{1-10}$ alkyl" refers to alkyl moieties containing saturated bonds and having one or more hydrogens replaced by, for example, halogen, carbonyl, alkoxy, ester, ether, cyano, phosphoryl, , imino, alkylthio, thioester, sulfonyl, nitro, heterocyclo, aryl, or heteroaryl.

The terms "halo" or "halogen" as used herein refers to fluoro, chloro, bromo and iodo.

The term "monocyclic" as used herein refers to groups comprising a single ring system. The ring system may be aromatic, heterocyclic, aromatic heterocyclic, a saturated cycloalkyl, or an unsaturated cycloalkyl. The monocyclic group may be substituted or unsubstituted. Monocyclic alkyl groups may have 5 to 12 ring members.

The term "polycyclic" as used herein refers to groups comprising multiple ring systems. The rings may be fused or unfused. The polycyclic group may be aromatic, heterocyclic, aromatic heterocyclic, a saturated cycloalkyl, an unsaturated cycloalkyl, or a combination of two or more of the foregoing. The polycyclic group may be substituted or unsubstituted. Polycyclic groups may have 6 to 20 ring members.

The term "aryl" is intended to mean, an aromatic moiety containing the specified number of carbon atoms, such as, but not limited to phenyl, indanyl or naphthyl.

The term "cycloalkyl" are intended to mean any stable ring system, which may be saturated or partially unsaturated. Examples of such include, but are not limited to, cyclopropyl, cyclopentyl, cyclohexyl, norbornyl, bicyclo[2.2.2]nonane, adamantyl, or tetrahydronaphthyl (tetralin). The term "cycloalkyl" is further intended to include all isomers both geometric and optical.

As used herein, the term "heterocycle" or "heterocyclic system" is intended to mean a stable 5- to 7-membered monocyclic or 7- to 10-membered bicyclic heterocyclic ring which is saturated, partially unsaturated, unsaturated or aromatic, and which consists of carbon atoms and 1 to 4 heteroatoms independently selected from the group consisting of N, O and S and including any bicyclic group in which any of the above-defined heterocyclic rings is fused to a benzene ring. The nitrogen and sulfur heteroatoms may optionally be oxidized. The heterocyclic ring may be attached to its pendant group at any heteroatom or carbon atom that results in a stable structure. In this regard, a nitrogen in the heterocycle may optionally be quaternized. When the total number of S and O atoms in the heterocycle exceeds 1, then these heteroatoms are not adjacent to one another. In some embodiments the total number of S and O atoms in the heterocycle is not more than 1.

As used herein, the term "aromatic heterocyclic system" is intended to mean a stable 5- to 7-membered monocyclic or 7- to 10-membered bicyclic heterocyclic aromatic ring which consists of carbon atoms and from 1 to 4 heteroatoms independently selected from the group consisting of N, O and S. In some embodiments the total number of S and O atoms in the aromatic heterocycle is not more than 1.

Examples of heterocycles include, but are not limited to, 1H-indazole, 2-pyrrolidonyl, 2H,6H-1,5,2-dithiazinyl, 2H-pyrrolyl, 3H-indolyl, 4-piperidonyl, 4alphaH-carbazole, 4H-quinolizinyl, 6H-1,2,5-thiadiazinyl, 5 acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazalonyl, carbazolyl, 4alphaH-carbazolyl, beta-carbolinyl, chromanyl, chromenyl, cinnolinyl, decahydroquinolinyl, 2H,6H-1,5,2-dithiazinyl, dihydrofuro[2,3-beta]tetrahydrofuran, furanyl, furazanyl, imidazolidinyl, imidazolinyl, imidazolyl, 1H-indazolyl, indolenyl, indolinyl, indolizinyl, indolyl, isobenzofuranyl, isochromanyl, isoindazolyl, isoindolinyl, isoindolyl, isoquinolinyl, isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolidinylperimidinyl, phenanthridinyl, phenanthrolinyl, phenarsazinyl, phenazinyl, phenothiazinyl, phenoxathiinyl, phenoxazinyl, phthalazinyl, piperazinyl, piperidinyl, pteridinyl, piperidonyl, 4-piperidonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, pyrrolyl, quinazolinyl, quinolinyl, 4H-quinolizinyl, quinoxalinyl, quinuclidinyl, carbolinyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, xanthenyl. Preferred heterocycles include, but are not limited to, pyridinyl, furanyl, thienyl, pyrrolyl, pyrazolyl, imidazolyl, indolyl, benzimidazolyl, 1H-indazolyl, oxazolidinyl, benzotriazolyl, benzisoxazolyl, oxindolyl, benzoxazolinyl, or isatinoyl. Also included are fused ring and spiro compounds containing, for example, the above heterocycles.

The term "independently selected from", "independently, at each occurance" or similar language, means that the labeled R substitution groups may appear more than once and may be the same or different when appearing multiple times in the same structure. Thus the $R^1$ may be the same or different than the $R^6$ and if the labeled $R^6$ substitution group appears four times in a given permutation of Formula I, then each of those labeled $R^6$ substitution groups may be, for example, a different alkyl group falling within the definition of $R^6$.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

All cited patents, patent applications, and other references are incorporated herein by reference in their entirety as though set forth in full.

The invention claimed is:

1. A thermoplastic composition comprising:
a polysiloxane/polyimide block copolymer having 5 to 50 weight percent polysiloxane, based on the total weight of the polysiloxane/polyimide block copolymer; and
a polyester/polyether block copolymer having 5 to 30 weight percent polyether content based on the total weight of the polyester/polyether block copolymer
wherein the polysiloxane/polyimide block copolymer is present in an amount of 90 to 99 weight percent based on the combined weight of the polysiloxane/polyimide block copolymer and the polyester/polyether block copolymer.

2. The composition of claim 1, wherein the polyester/polyether block copolymer has a polyether portion selected from the group consisting of polybutylene ethers, polypropylene ethers, polyethylene ethers, polyether copolymers containing a combination of two or more of butylene ether, propylene ether and ethylene ether, and combinations of two or more of the foregoing polyethers.

3. The composition of claim 2 wherein the polyether portion has a number average molecular weight of 1,000 to 10,000.

4. The composition of claim 1, wherein the polyester/polyether block copolymer has 5 to 30 weight percent polybutylene ether content based on the total weight of the polyester/polyether block copolymer.

5. The composition of claim 1, wherein the polysiloxane/polyimide block copolymer has a polysiloxane portion having a number average molecular weight of 300 to 3,000.

6. The composition of claim 1, wherein polysiloxane/polyimide block copolymer comprises a polyetherimide block derived from the imidization reaction of a dianhydride and a diamine wherein the dianhydride is selected from the group consisting of bisphenol A dianhydrides, biphenyl dianhydrides, pyromellitic dianhydrides, oxydiphthalic anhydrides, biphenol dianhydrides, benzophenone tetra carboxylic dianhydrides, and combinations of two or more of the foregoing dianhydrides, and wherein the diamine is selected from the group consisting of meta phenylene diamine, para phenylene diamine, sulfonyl dianilines, oxydianilines, bis aminophenoxy phenyl sulfones, methylene dianilines, bis amino phenoxy benzenes, and combinations of two or more of the foregoing diamines.

7. The composition of claim 1, wherein the composition has less than 100 parts by weight of a halogenated aromatic solvent per million parts by weight of the composition, wherein the halogenated aromatic solvent has a molecular weight of 110 to 600.

8. The composition of claim 1, wherein the composition has less than 1000 parts by weight of bromine or chlorine per million parts by weight of the composition.

9. The composition of claim 1, wherein the composition has a flexural modulus ranging of 350 to 1,200 megaPascals as determined by ASTM D790 at a thickness of 3.2 millimeters.

10. The composition of claim 1, wherein the composition has a percent transmission of greater than or equal to 40% as determined by ASTM D1003 at a thickness of 3.2 millimeters and a wavelength of 700 nanometers.

11. The composition of claim 1, wherein the composition has a tensile elongation at break of greater than or equal to 20% as determined by ASTM D638.

12. The composition of claim 1, wherein polyester/polyether block copolymer has a polyester portion derived by the esterification reaction of an aromatic dicarboxylic acid and a diol wherein the aromatic dicarboxylic acid is selected from the group consisting of isophthalic acid, terephthalic acid, naphthalene dicarboxylic acids, cyclohexane dicarboxylic acids and combinations of two or more of the foregoing dicarboxylic acid, and further wherein the diol is selected from the group consisting of butane diols, propane diols, ethane diol, cyclohexane diols, and combinations of two or more of the foregoing diols.

13. The composition of claim 1 further comprising 1 to 5 weight percent of silica, titanium dioxide, carbon black, or a combination of two or more of the foregoing based on the combined weight of the polyetherimide-polysiloxane block copolymer and the polyester/polyether block copolymer.

14. An article made from the composition of claim 1.

15. The article of claim 14 comprising a tube or coated wire.

16. The article of claim 15 wherein the wire comprises a metal selected from the group consisting of copper, aluminum, silver, gold, iron, nickel, chromium and alloys comprising one or more of the foregoing metals.

17. The article of claim 15 wherein the wire comprises an optical fiber.

18. The composition of claim 1, wherein the polysiloxane/polyimide block copolymer has a siloxane content ranging from 5 to 30 weight percent, based on the total weight of the block copolymer and comprising repeating units of formula (XI)

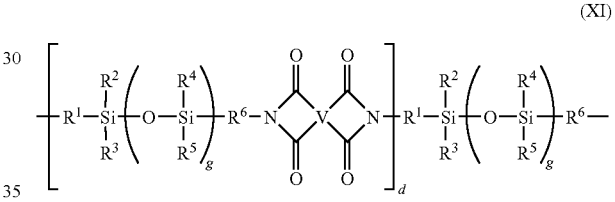

wherein $R^{1-6}$ are independently at each occurrence selected from the group consisting of substituted or unsubstituted, saturated, unsaturated or aromatic monocyclic and polycyclic groups having 5 to 30 carbon atoms, substituted or unsubstituted alkyl groups having 1 to 30 carbon atoms and substituted or unsubstituted alkenyl groups having 2 to 30 carbon atoms,
V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers,
g equals 1 to 30, and
d is greater than or equal to 1.

19. A thermoplastic composition consisting of:
a polysiloxane/polyimide block copolymer having 5 to 50 weight percent polysiloxane, based on the total weight of the polysiloxane/polyimide block copolymer; and
a polyester/polyether block copolymer having 5 to 30 weight percent polybutylene ether content based on the total weight of the polyester/polyether block copolymer,
wherein the polysiloxane/polyimide block copolymer is present in an amount of 90 to 99 weight percent based on the combined weight of the polysiloxane/polyimide block copolymer and the polyester/polyether block copolymer.

* * * * *